United States Patent
Liu et al.

(10) Patent No.: US 8,842,649 B2
(45) Date of Patent: Sep. 23, 2014

(54) REMOTE RADIO DATA TRANSMISSION OVER ETHERNET

(75) Inventors: Weihua Liu, Beijing (CN); Kai Chen, Beijing (CN); Weiguo Ma, Beijing (CN); Sören Norberg, Stockholm (SE)

(73) Assignee: China Academy of Telecommunications Technology, Beijing (CN)

( * ) Notice: Subject to any disclaimer, the term of this patent is extended or adjusted under 35 U.S.C. 154(b) by 134 days.

(21) Appl. No.: 13/379,085

(22) PCT Filed: Mar. 12, 2010

(86) PCT No.: PCT/CN2010/000306
§ 371 (c)(1),
(2), (4) Date: Jan. 30, 2012

(87) PCT Pub. No.: WO2010/145187
PCT Pub. Date: Dec. 23, 2010

(65) Prior Publication Data
US 2012/0113972 A1    May 10, 2012

(30) Foreign Application Priority Data

Jun. 19, 2009  (CN) .......................... 2009 1 0087409

(51) Int. Cl.
*H04W 4/00*   (2009.01)
*H04L 29/06*  (2006.01)
*H04W 88/08*  (2009.01)
*H04L 29/08*  (2006.01)

(52) U.S. Cl.
CPC ............. *H04W 88/085* (2013.01); *H04L 69/08* (2013.01); *H04L 69/22* (2013.01); *H04L 69/323* (2013.01)
USPC ........................................... 370/338; 370/328

(58) Field of Classification Search
USPC .......... 370/328–339, 310–313, 465–474, 320
See application file for complete search history.

(56) References Cited

U.S. PATENT DOCUMENTS

2004/0015717 A1 *   1/2004   Colas et al. ................... 713/200
2011/0135013 A1 *   6/2011   Wegener ....................... 375/241
2011/0243071 A1 *  10/2011   Wu et al. ....................... 370/328

FOREIGN PATENT DOCUMENTS

| CN | 1956564 A | 5/2007 |
| CN | 101005450 A | 7/2007 |
| CN | 101242435 A | 8/2008 |
| CN | 101248689 A | 8/2008 |
| CN | 101257667 A | 9/2008 |
| WO | WO2005034544 | * 4/2005 |
| WO | 2007134950 A1 | 11/2007 |

* cited by examiner

*Primary Examiner* — Ricky Ngo
*Assistant Examiner* — Iqbal Zaidi
(74) *Attorney, Agent, or Firm* — Fraser Clemens Martin & Miller LLC; J. Douglas Miller

(57) ABSTRACT

The invention discloses a method for transmitting data between a radio equipment (RE) and a radio equipment control (REC) of a radio base station via Ethernet. The method comprises in adaptive physical layer, adapting data frames complying with a remote radio protocol to Ethernet data frames that are suitable for transmission over Ethernet physical layer, and transmitting the adapted Ethernet data frames over the Ethernet physical layer.

16 Claims, 6 Drawing Sheets

| Lane0 | ... | K | S  | 16×D | D4 | A | K | S  | 16×D | D4 | A | ... |
|-------|-----|---|----|------|----|---|---|----|------|----|---|-----|
| Lane1 | ... | K | D1 | 16×D | D5 | A | K | D1 | 16×D | D5 | A | ... |
| Lane2 | ... | K | D2 | 16×D | D6 | A | K | D2 | 16×D | D6 | A | ... |
| Lane3 | ... | K | D3 | 16×D | T  | A | K | D3 | 16×D | T  | A | ... |

FIG. 9A

| Lane0 | ... | I | S  | 16×D | D4 | I | I | S  | 16×D | D4 | I | ... |
|-------|-----|---|----|------|----|---|---|----|------|----|---|-----|
| Lane1 | ... | I | D1 | 16×D | D5 | I | I | D1 | 16×D | D5 | I | ... |
| Lane2 | ... | I | D2 | 16×D | D6 | I | I | D2 | 16×D | D6 | I | ... |
| Lane3 | ... | I | D3 | 16×D | T  | I | I | D3 | 16×D | T  | I | ... |

FIG. 9B

| Lane0 | ... | K | S   | Dp1 | Dp5  | Dp9  | Dp5 | 32×D | Di4 | A | ... |
|-------|-----|---|-----|-----|------|------|-----|------|-----|---|-----|
| Lane1 | ... | K | Di1 | Dp2 | Dp6  | Dp10 | Dp5 | 32×D | Di5 | A | ... |
| Lane2 | ... | K | Di2 | Dp3 | Dp7  | Dp11 | Dp5 | 32×D | Di6 | A | ... |
| Lane3 | ... | K | Di3 | Dp4 | Dp8  | Dp12 | Dp5 | 32×D | T   | A | ... |

FIG. 10

| Lane0 | ... | K | S  | D4 | D8  | 24×D | D12 | A | ... |
|-------|-----|---|----|----|-----|------|-----|---|-----|
| Lane1 | ... | K | D1 | D5 | D9  | 24×D | D13 | A | ... |
| Lane2 | ... | K | D2 | D6 | D10 | 24×D | D14 | A | ... |
| Lane3 | ... | K | D3 | D7 | D11 | 24×D | T   | A | ... |

FIG. 11

REMOTE RADIO DATA TRANSMISSION OVER ETHERNET

TECHNICAL FIELD

The present invention generally relates to wireless communication, particularly to a data transmitting and receiving method between a radio equipment (RE) and a radio equipment control (REC).

BACKGROUND

In some current 3G, Wimax and LTE (Long Term Evolution) radio access networks, the base station is configured as a concentrated node with essentially most of the components being located at concentrated site. However, a radio base station can also be configured with a more distributed architecture. For example, a distributed radio base station can take the form of one or more radio equipment (RE) portions that are linked to a radio equipment control (REC) portion over a radio base station internal interface.

FIG. 1 is a schematic diagram illustrating the internal connections inside the radio base station. The radio base station includes a REC and a RE, with a radio base station internal interface shown as CPRI (Common Public Radio Interface) which connects the REC and the RE. The Common Public Radio Interface (CPRI) is described in Common Public Radio Interface (CPRI) Interface Specification Version 3.0 (Oct. 20, 2006), which is incorporated herein by reference. The interface between the REC and RE may also include, for example, Open Base Station Architecture Initiative (OBSAI), Ir (an interface between a base band unit (BBU) and a remote radio unit (RRU)), etc.

The CPRI is typically implemented on optical fiber and currently supports maximum line bit rate of 2.4576 Gbps. With rapid development of mobile communication service, the amount of data as transferred between the REC and RE are increasing dramatically. For example, operators like China Mobile now requires a TD-SCDMA (time division synchronous code division multiple access) base station with maximum capacity of 192A×C (A=antenna and C=carrier), or a LTE base station with 20 MHz bandwidth and 8 antennas. For such a base station, it is required to transfer roughly 9 Gbps data between a REC and a RE for transmission and reception respectively. Take a LTE base station with 20 MHz bandwidth and 8 antennas as an example. For the baseband sampling rate 30.72 MHz/s in LTE standard, normally, IQ (including the real part and the imaginary part) bit width is 16 bits, after passing through the 8 B/10 B encoder for clock recovery and line DC balance defined in CPRI and Ir physical layer, the data rate is 1.2288 Gbps for one antenna. The total Tx or Rx data rate for 8 antennas is 1.2288 Gbps*8=9.8304 Gbps. Therefore, the LTE base station needs four 2.4576 Gbps CPRI links, physically, 4 fibers between the REC and one RE, in order to support 8 antennas data.

In a typical deployment as shown in FIG. 2, one REC may be connected with 3 REs, which means 12 fibers are need for data transmission there between. Large number of fibers may lead to high cost on construction and maintenance as well.

SUMMARY

Therefore, it is an object of the present invention to develop a solution which may reduce the number of fibers as required for data transmission between REC and RE(s) in the radio base station.

According to one aspect of the invention, the object may be implemented by providing a method for transmitting data between a radio equipment (RE) and a radio equipment control (REC) of a radio base station via Ethernet, characterized in that, said method comprises in adaptive physical layer adapting data frames complying with a remote radio protocol to Ethernet data frames that are suitable for transmission over Ethernet physical layer, and transmitting the adapted Ethernet data frames over the Ethernet physical layer.

The Ethernet may be 10 Gigabit Ethernet. The remote radio protocol may include at least one of Common Public Radio Interface (CPRI), OBSAI and Ir.

The adapting may comprise filling the data frames complying with the remote radio protocol with redundant bytes, wherein the redundant bytes include control information inside the Ethernet data frame and control information between the Ethernet data frames. A number of /A/ columns, /K/ columns or /R/ columns may be filled between the Ethernet data frames so as to output the Ethernet data frames to the Ethernet physical layer via XAUI interface, wherein the /A/ column, /K/ column and /R/ column are respectively Align column, Sync column and Skip column defined by the Ethernet protocol.

A number of /I/ columns may be filled between the Ethernet data frames so as to output the Ethernet data frames to the Ethernet physical layer via XGMII interface, wherein the /I/ column are Idle column defined by the Ethernet protocol.

The method may further comprise adapting reference clock of the Ethernet physical layer. The adapted reference clock of the Ethernet physical layer may be 153.6 MHz.

The adapting may comprise replacing data in the data frames complying with the remote radio protocol which is in conflict with the Ethernet control information. The adapting may comprise using other Ethernet control information to identify the replacing location.

According to another aspect of the invention, the object may be implemented by providing a method for receiving data between a radio equipment (RE) and a radio equipment control (REC) of a radio base station via Ethernet. The method comprises receiving over Ethernet physical layer Ethernet data frames which are transmitted according to the above method for transmitting data, and in adaptive physical layer, recovering the Ethernet data frames to data frames complying with the corresponding remote radio protocol.

According to a further aspect of the invention, the object may be implemented by a device for transmitting data between a radio equipment (RE) and a radio equipment control (REC) of a radio base station via Ethernet. The device comprises an adaptive physical layer module being arranged for adapting data frames complying with a remote radio protocol to Ethernet data frames that are suitable for transmission over Ethernet physical layer and a physical layer module being arranged for transmitting the adapted Ethernet data frames over the Ethernet physical layer.

The Ethernet may be 10 Gigabit Ethernet. The remote radio protocol may include at least one of Common Public Radio Interface (CPRI), OBSAI and Ir.

The adaptive physical layer module may comprise a filling module being arranged for filling the data frames complying with the remote radio protocol with redundant bytes, wherein the redundant bytes include control information inside the Ethernet data frame and control information between the Ethernet data frames.

The filling module may be arranged to fill a number of /A/ columns, /K/ columns or /R/ columns between the Ethernet data frames, and output the Ethernet data frames to the Ethernet physical layer via XAUI interface, wherein the /A/ column, /K/ column and /R/ column are respectively Align column, Sync column and Skip defined by the Ethernet protocol.

The filling module may be arranged to fill a number of /I/ columns between the Ethernet data frames, and output the Ethernet data frames to the Ethernet physical layer via XGMII interface, wherein the /I/ column are Idle column defined by the Ethernet protocol.

Reference clock of the Ethernet physical layer may be adapted. The adapted reference clock of the Ethernet physical layer may be 153.6 MHz.

The adaptive physical layer module may comprise replacing module being arranged for replacing data in the data frames complying with the remote radio protocol which is in conflict with the Ethernet control information. The adaptive physical layer module may be arranged to use other Ethernet control information to identify the replacing location.

According to a further aspect of the invention, the object may be implemented by a device for receiving data between a radio equipment (RE) and a radio equipment control (REC) of a radio base station via Ethernet. The device comprises a physical layer module for receiving over Ethernet physical layer Ethernet data frames which are transmitted by the above device for transmitting data, and an adaptive physical layer module for recovering the Ethernet data frames to data frames complying with the corresponding remote radio protocol.

According to a further aspect of the invention, the object may be implemented by a radio equipment control (REC). The REC comprises the above device for transmitting data and the above device for receiving data.

According to a further aspect of the invention, the object may be implemented by a radio equipment (RE). The RE comprises the above device for transmitting data and the above device for receiving data.

According to a further aspect of the invention, the object may be implemented by a radio base station. The RE comprises the above REC and the above RE.

BRIEF DESCRIPTION OF THE DRAWINGS

The invention, together with further objects and advantages thereof, will be best understood by reference to the following description taken together with the accompanying drawings, in which:

FIGS. 9A and 9B schematically show the format of Ethernet data frames generated from CPRI data frames in case of XAUI interface and XGMII interface respectively according to an embodiment of the invention;

FIG. 10 schematically show the format of Ethernet data frames generated from CPRI data frames in case of XAUI interface according to another embodiment of the invention; and FIG. 11 schematically shows the format of Ethernet data frames generated from Ir data frames in case of XAUI interface according to another embodiment of the invention.

DETAILED DESCRIPTION

Figure 1:
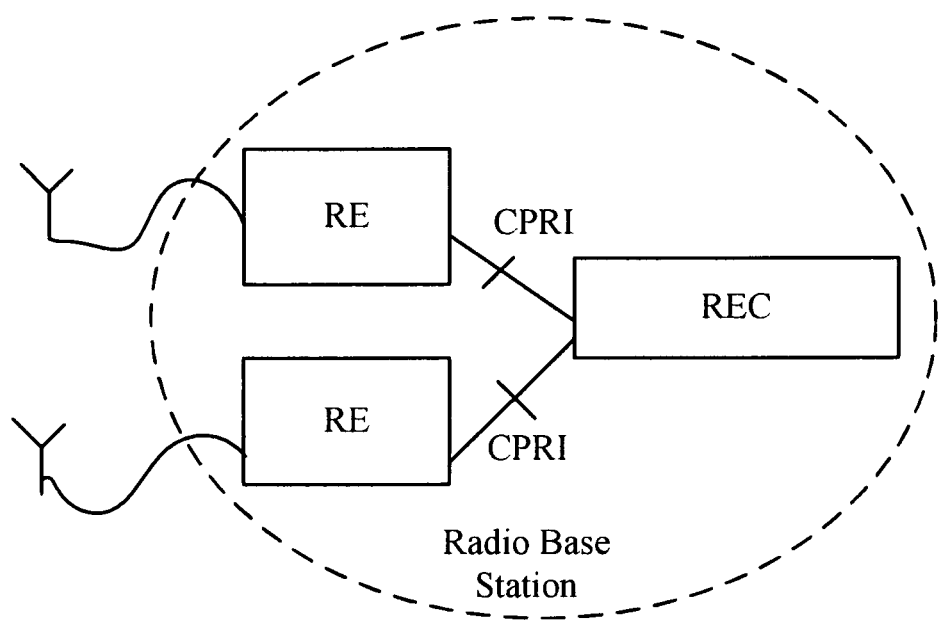
FIG. 1 is a schematic diagram illustrating the internal connections inside the radio base station.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The invention will be described in context of a LTE base station with 20 MHz bandwidth and 8 antennas, however, it should be understood that the invention should not be limited to this, and can be applied to all the existing and future 3G (including WCDMA, CDMA 2000 and TD-SCDMA), Wimax and LTE base stations, as long as the amount of fibers or cables as required for data transmission over remote radio interfaces can be reduced. The terms radio equipment control (REC) and radio equipment (RE) which are defined in the CPRI protocol are used herein, but it should be understood that other terms such as base band unit (BBU) and remote radio unit (RRU) may be used in other standards or protocols to refer to the same entities. It should be also understood that the invention may be applied to other type of remote radio protocols and Ethernets, although the invention is described in context of CPRI and 10 Gigabit Ethernet (10 GbE). Currently fibers are widely used as the physical layer transmission media of the Ethernet and remote radio protocols, but it should be understand that the invention may also be applied to the situation of using other transmission media such as cables.

The invention will be described below, with reference to the drawings.

In order to reduce the amount of fibers between REC and RE, the invention proposes to use 10 Gigabit Ethernet (10 GbE) to carry the CPRI data or other remote radio protocol data.

Figure 2:
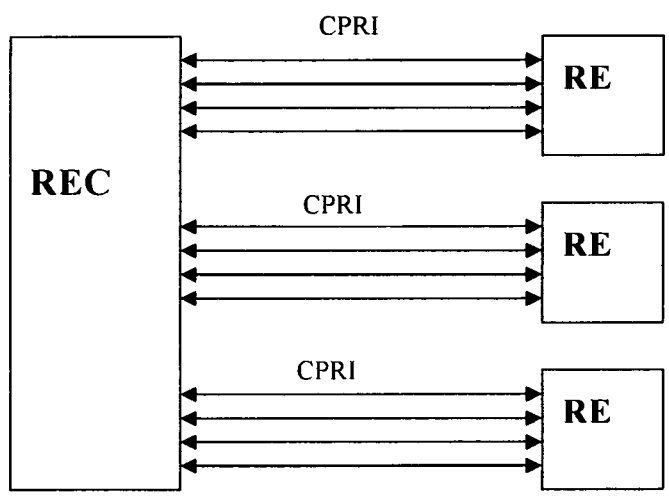
FIG. 2 shows a typical radio base station deployment using 12 CPRI fiber links to connect one REC and 3 RE.
Figure 3:
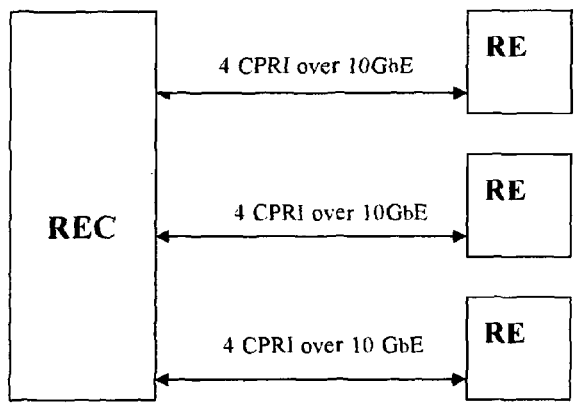
FIG. 3 shows a radio base station deployment using 3 10 GbE fiber links to connect one REC and 3 RE according to the invention.

10 GbE was published as IEEE 802.3 standards such as 802.3 ae-2002. Due to its widespread commercial acceptance and great capability, it is conceived to encapsulate the data of CPRI or other remote radio protocols into 10 GbE packages and transmit the packages over 10 GbE PHY and fiber between REC and RE(s). As shown in FIG. 3, the 8 antennas LTE radio base station needs only 3 10 GbE links (¼ number of fibers as compared with FIG. 2) to transmit CPRI data between three REs and a REC.

However, 10 GbE is dedicated for Ethernet area. To make it serve for Radio Base Station, we need some adaption, which will be explained hereinbelow.

Figure 4:
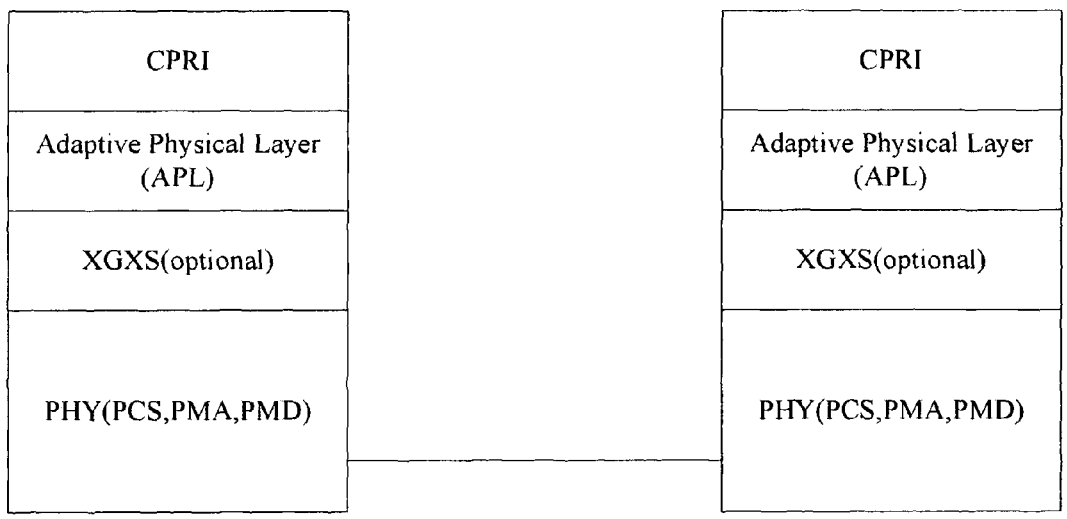
FIG. 4 is an architecture view illustrating the layer involved in transmission of CPRI data over 10 GbE physical layer according to the invention.

FIG. 4 is an illustrating the layer involved in transmission of CPRI data over the 10 GbE physical layer according to the invention. The layers, from top to bottom, are CPRI layer, Adaptive Physical Layer (APL) and the Ethernet Physical (PHY) layer.

The CPRI layer adds frame header to baseband data and packetizes it into frame format as prescribed by CPRI protocol.

APL is a newly introduced layer for adapting and packetizing the data from CPRI layer to comply with the 10 GbE PHY data frame format as prescribed by IEEE 802.3 protocol.

The Ethernet PHY layer includes three sublayers, Physical Coding Sublayer (PCS), Physical Media Attachment sublayer (PMA) and Physical Media Dependent sublayer (PMD). The PCS is defined by Ethernet protocol for encoding and decoding the physical layer data. For example, for XAUI interface (10 gigabit attachment unit interface), the PCS uses 8 B/10 B encoding. PMA provides serial-to-parallel conversion between the PCS and PMD, and further extracts from the received serial data flow the symbol timing clock for correctly aligning the received data. The PMD, as the lowest sublayer of Ethernet PHY, transforms electronic signals from PMA into a format that suit transmission over specific media.

In addition, the APL and PHY layers may have a XGSX sublayer therebetween if they are interfaced via the XAUI.

As can be seen, the APL has been introduced to adapt the gap between the CPRI (or other remote radio protocol) data and 10 GbE Ethernet PHY.

Figure 5:
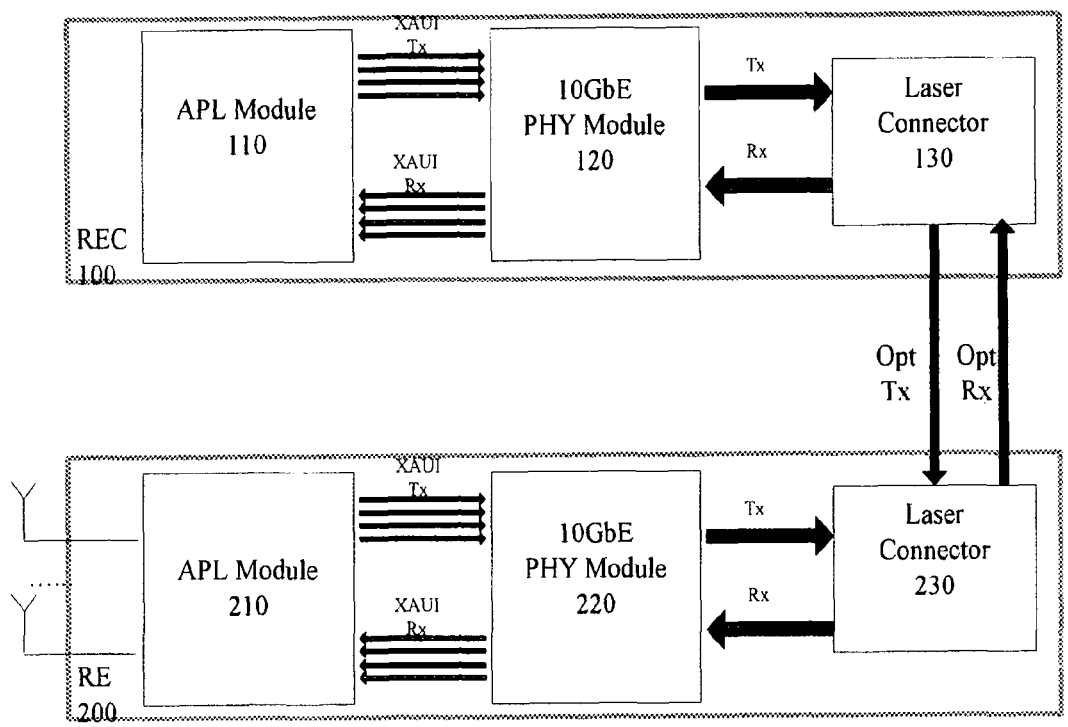
FIG. 5 is a system block diagram illustrating transmission of CPRI data over 10 GbE physical layer according to the invention.

FIG. 5 is a system block diagram illustrating transmission of CPRI data over 10 GbE physical layer according to the invention.

As shown in FIG. 5, the radio base station includes a REC 100 and a RE 200. The REC 100 includes an APL module 110, a 10 GbE PHY module 120 and a laser connector 130. The RE 200 includes an APL module 210, a 10 GbE PHY module 220 and a laser connector 230.

When transmitting Ethernet data from the REC 100 to the RE 200, the APL module 110 adapts CPRI data frames to Ethernet data frames that are suitable for transmission over Ethernet physical layer. The 10 GbE PHY module 120 implements functions of PCS and PMA, and transmits the Ethernet data frames over the Ethernet PHY layer via the laser connector 130 (PMD). Although shown as a separate unit, the laser connector 130 may be alternatively be integrated in the 10 GbE PHY module 120. The APL module 110 may connect with the 10 GbE PHY module 120 via the XAUI interface. The XAUI interface is a four-lane serial interface for connecting the MAC (Media Access Control) layer and the PHY layer as defined in the 10 GbE protocol. The laser connector 230 and 10 GbE PHY module 220 of the RE 200 receives the Ethernet data frames from the REC 100 over the Ethernet PHY layer, and the APL module 210 recovers the Ethernet data frames to CPRI data frames.

The process for transmitting Ethernet data from the RE 200 to the RE 100 is the same, and will not be further explained.

In addition to adding the APL layer, the invention proposes to adapt the reference clock of the conventional 10 GbE PHY layer for facilitating CPRI data transmission.

In the current 3G systems, the chip rate is 3.84 M for WCDMA and 1.28 M for TDS-CDMA, both related to 30.72 MHz. In other words, 30.72 MHz is 8 times of 3.84 M and 24 times of 1.28 M. Generally, baseband sampling rate is 30.72 MHz related, and in a LTE system, baseband sampling rate is 30.72 M for 20 MHz radio bandwidth and 15.36 MHz for 10 MHz radio bandwidth. Consequently, 30.72 MHz reference frequency is a critical factor in current widely deployed wireless telecomm systems.

However, the conventional 10 GbE now applies 156.25 MHz as PHY reference clock. To facilitate transmission over 10 GbE of the baseband data whose sample rate is 30.72 MHz related, the invention proposes to select 153.6 MHz, i.e. 5 times of 30.72 MHz, as reference clock for the 10 GbE PHY. The new reference clock 153.6 MHz is very close to the standard 156.25 MHz, and can be supported by the current 10 GbE PHY chips.

The RE has to recover the expected reference clock from the fiber for radio reference and sampling rate reference. Since the recovered clock performance required at the RE is more restricted and tight than the conventional Ethernet, connecting the REC and RE with the Sync Ethernet solution with 153.6 MHz reference clock can easily obtain the 30.72 MHz related clock. At the RE, a narrow bandwidth Phase Lock Loop (PLL) and a high performance Voltage-controlled crystal oscillator (VCXO) may be used to track the recovered clock and clear jitter to meet the radio performance.

Once the reference clock is adjusted, the data rate radio of the CPRI 4× link and XAUI link is 4:5, and thus the data rate can be conveniently matched by filling redundant bytes.

Hereinbelow it will be explained in detail how to implement the adaption between the 10 GbE PHY and CPRI data.

Figure 6:
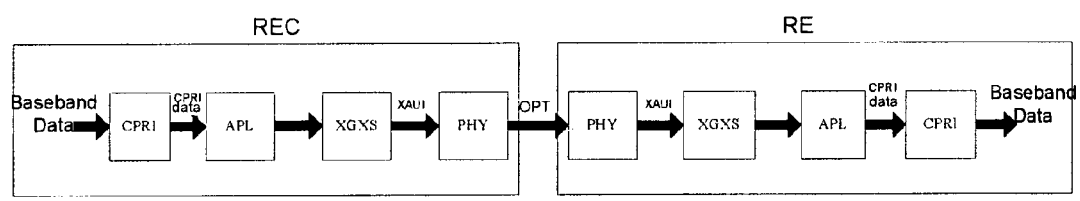
FIG. 6 and FIG. 7 are data flow diagrams in case of XAUI and XGMII interfaces respectively.
Figure 7:
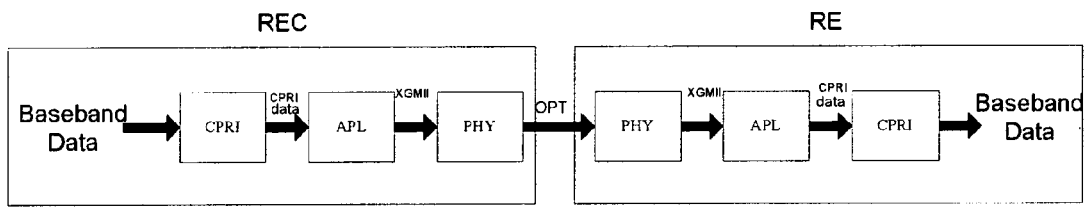

FIG. 6 and FIG. 7 are data flow diagrams in case of XAUI and XGMII interfaces respectively.

As shown in FIG. 6, when transmitting baseband data from the REC to RE, the baseband data is firstly transformed to CPRI data frames by the CPRI layer and output to the APL layer. The APL layer adapts the CPRI data frames to Ethernet data frames and sends the Ethernet data frames to the Ethernet PHY layer via the XGXS sublayer and XAUI interface, for transmission over optical fibers to the RE. The XGXS sublayer is the XGMII Extender Sublayer as defined by the Ethernet protocol for parallel-serial conversion and 8 B/10 B encoding and decoding. At the RE, the received Ethernet data frames are recovered to CPRI data frames and further recovered to baseband data.

Alternatively, as shown in FIG. 7, the output of the APL layer may directly go to the Ethernet PHY chip through the XGMII interface without passing the XGXS sublayer. The XGMII interface is the 10 GbE media independent interface as defined in the 10 GbE protocol.

Figure 8:
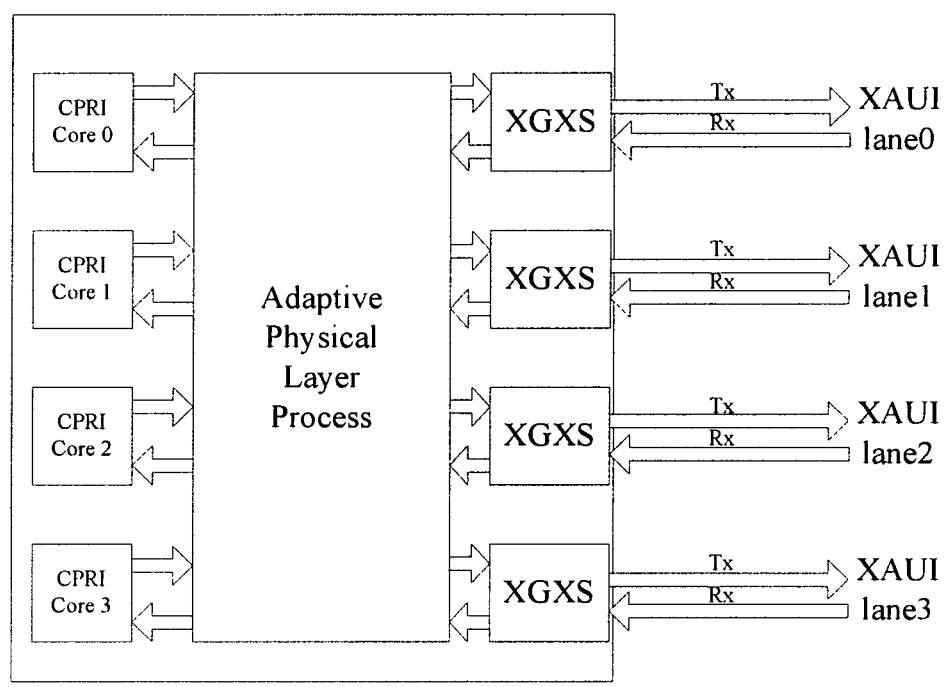
FIG. 8 is a diagram showing implementation of CPRI and APL in case of XAUI interface.

FIG. 8 is a diagram showing implementation of CPRI and APL layers in case of XAUI interface Each line rate of XAUI is 3.072 Gbps which is also 30.72 MHz related. As can be seen, the data ratio between the CPRI 4× link and XAUI link is 4:5.

For transmission, one among five time slots will be idle. The APL module of the transmitting side fills in this idle time slot Ethernet redundant bytes, for example by its filing module (not shown), and the Ethernet redundant bytes together with CPRI data frames (payload) form continuous stream of Ethernet data frames for transmission over the Ethernet PHY layer. The filled redundant bytes may include control information filled inside the Ethernet data frame such as start control word /S/ and end control word /T/ and control information filled between the Ethernet data frames such as /A/ column and /K/ column.

For receiving, the APL module of the receiving side may identify and remove the filled redundant bytes, and send the CPRI data frames to the CPRI layer. From the view of the CPRI layer on the receiving side, continuous CPRI data stream is received.

Generally, the ratio between the CPRI data and redundant bytes in each Ethernet data frame as generated in the APL layer is fixed, depending on the ratio between the CPRI data rate and XAUI data rate. However, the length of the CPRI data and of redundant bytes could be 4 bytes vs. 1 bytes, or 8 bytes vs. 2 bytes, and so on. The only limitation is the maximum data length of a Ethernet data frame as defined in Ethernet protocol.

Subsequently, the format of the Ethernet data frames generated by the APL layer according to the invention will be discussed.

FIGS. 9A and 9B show the format of Ethernet data frames generated from CPRI data frames in case of XAUI interface and XGMII interface respectively according to the invention.

Each Ethernet data frame generated by APL layer includes an effective data (payload) portion and a inner-frame control information portion, and inter-frame control information is filled between two Ethernet data frames. CPRI data frames are filled in the effective data portion as payload. In the example as shown in FIG. 9A, there are 16 bytes of CPRI data and 4 bytes of filled redundant bytes on each lane of the XAUI. In implementation, the length of Ethernet data frame can be configured as needed.

Among the redundant bytes as shown in FIGS. 9A and 9B,
the Terminate control word (/T/) indicates the end of a Ethernet data frame;
the Start control word (/S/) indicates the start of a Ethernet data frame;
the control word columns /A/, /K/, /R/ (not shown) and /I/ are filled between two Ethernet data frames, wherein
the /A/ column is the Align column defined by the Ethernet protocol for aligning the data on the four lanes of the XAUI, and consists of 4 K28.3;
the /K/ column is the Sync column defined by the Ethernet protocol for 8 B/10 B delimiting the serial data on each lane of the XAUI, and consists of 4 K28.5;
the /R/ column is the Skip column defined by the Ethernet protocol for compensating the inconsistency between both sides of the Ethernet by being copied or discarded, and consists of 4 K28.0.

If the Ethernet data frames generated by the APL layer are to be output via XAUI, a number of /A/ columns, /K/ columns or /R/ columns are filled between two Ethernet data frames, as shown in FIG. 9A. Since the REC and RE connected by the Ethernet have consistent clock, /R/ is not necessary control information. It should also be noted that /R/ may appear randomly according some Ethernet rule, even if it is unused in this transfer scheme. It will replace the /K/ or /A/ when it is appeared. Actually, there is no fixed position to place /K/, /A/, /R/. The appearance may just follow a set of specific rules and automatically determined by the XGXS sublayer.

If the Ethernet data frames generated by the APL layer are to be output via XGMII, as shown in FIG. 9B, the /A/ columns, /K/ columns or /R/ columns on the XAUI will be equivalent to the /I/ columns on the XGMII, which are idle columns defined by the Ethernet protocol.

According to an embodiment of the invention, data in the data frames complying with the remote radio protocol which is in conflict with the Ethernet control information may be replaced by a replacing module (not shown) of the APL module on the transmitting side. For example, the Comma byte in CPRI data frame uses K28.5 as the sync word in CPRI protocol, which will be packetized as effective data of Ethernet data frame for transmission. However, according to the Ethernet protocol, K code is not allowed to appear in the effective data portion of the Ethernet data frame. Thus we may replace the K28.5 with normal data code (such as D28.5), and use the control information (such as D1-D6) inside the Ethernet data frame to identify the replacing position. On the receiving side, the replacing module of the APL module will recover the D28.5 in the Ethernet data frame back to K28.5.

Alternatively, column O defined by the Ethernet protocol could be inserted to indicate the replacing position. Similarly, other K codes in other remote radio protocols could be replaced.

FIG. 10 schematically show the format of Ethernet data frames generated from CPRI data frames in case of XAUI interface according to another embodiment of the invention, wherein 32 bytes of CPRI data and 8 bytes of filled redundant bytes are output on each lane of the XAUI.

In FIG. 10, Di1-Di6 are reserved idle data and can be any value;
Dp1-Dp16 are replacing bytes indication data for identifying the replacing position of the K codes replaced by D.

Furthermore, for other remote radio protocols such as OBSAI and Ir, appropriate Ethernet data frame format can be designed to adapt for the Ethernet PHY layer.

Also, since 4 CPRI lanes are independent, we may suppose that the K28.5 codes on each CPRI lanes are not aligned to facilitate implementation. The new APL does not consider the alignment of the K28.5 codes on the CPRI lanes either. The time delay on each CPRI lanes will be calculated and compensated independently.

FIG. 11 schematically shows the format of Ethernet data frames generated from Ir data frames in case of XAUI interface according to the invention.

In the example as shown in FIG. 11, there are 24 bytes of Ir data (including Ir frame header) and 6 bytes of filled redundant bytes on each lane of the XAUI.

Since the Ir protocol uses K28.5 for sync, and uses K27.7 and K29.7 as the Start of Packet Delimiter (SPD) and End of Packet Delimiter (EPD), we may replace the K28.5 with D28.5, K27.7 with D27.7, K29.7 with D29.7. To distinguish over D28.5, D27.7 and D29.7 in normal Ir data, we may use D1-D12 to indicate whether the corresponding byte is replaced and the location of replacement.

For example, D4, D8 and D12 are 3 bytes that have totally 24 bits connected from LSB to MSB. Each bit indicates whether the corresponding byte of the 24×D portion on the lane 0 is replaced. Similarly, each bit of D1, D5 and D9 indicates whether the corresponding byte of the 24×D portion on the lane 1 is replaced, and so on. D13 and D14 can be reserved and set to 0.

The invention adapt the CPRI or other remote radio protocol data to 10 GbE PHY layer by adapting the reference clock of Ethernet, adding APL layer and modifying the frame format and control information insertion, so as to efficiently transmit 4× CPRI or other remote radio protocol data over 10 GbE. The invention does not need any modification to the existing CPRI or other remote radio protocol. In a LTE base station with 20 MHz bandwidth and 8 antennas, only one 10 GbE fiber is needed to transmit the data between one REC and one RE, which reduces the required amount of fibers and therefore the cost of construction and maintenance for base station.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention not be limited to the particular embodiment disclosed as the best mode contemplated for carrying out the present invention, but that the present invention include all embodiments falling within the scope of the appended claims.

What is claimed is:

1. A method for transmitting data between a radio equipment (RE) and a radio equipment control (REC) of a radio base station via Ethernet, said method comprising:
   in adaptive physical layer, adapting data frames complying with a remote radio protocol to Ethernet data frames that are suitable for transmission over Ethernet physical layer; and
   transmitting the adapted Ethernet data frames over the Ethernet physical layer, characterized in that, the adapting comprises:
      filling the data frames complying with the remote radio protocol with redundant bytes, wherein the redundant bytes include control information inside the Ethernet data frame and control information between the Ethernet data frames, the filling comprising:
         filling a number of /A/ columns, /K/ columns or /R/ columns between the Ethernet data frames so as to output the Ethernet data frames to the Ethernet physical layer via XAUI interface, wherein the /A/ column, /K/ column and /R/ column are respectively Align column, Sync column and Skip column defined by the Ethernet protocol.

2. The method according to claim 1, characterized in that, the Ethernet is 10 Gigabit Ethernet.

3. The method according to claim 1, characterized in that, the remote radio protocol includes at least one of Common Public Radio Interface (CPRI), OBSAI and Ir.

4. A method for transmitting data between a radio equipment (RE) and a radio equipment control (REC) of a radio base station via Ethernet, said method comprising:
   in adaptive physical layer, adapting data frames complying with a remote radio protocol to Ethernet data frames that are suitable for transmission over Ethernet physical layer; and
   transmitting the adapted Ethernet data frames over the Ethernet physical layer, characterized in that, the adapting comprises:
      filling the data frames complying with the remote radio protocol with redundant bytes, wherein the redundant bytes include control information inside the Ethernet data frame and control information between the Ethernet data frames, characterized in that, the filling comprises:
         filling a number of /I/ columns between the Ethernet data frames so as to output the Ethernet data frames to the Ethernet physical layer via XGMII interface, wherein the /I/ column are Idle column defined by the Ethernet protocol.

5. The method according to claim 1, characterized in that, it further comprises adapting reference clock of the Ethernet physical layer.

6. The method according to claim 5, characterized in that, the adapted reference clock of the Ethernet physical layer is 153.6 MHz.

7. The method according to claim 6, characterized in that, the adapting further comprises:
   using other Ethernet control information to identify the replacing location.

8. The method according to claim 1, characterized in that, the adapting comprises:
   replacing data in the data frames complying with the remote radio protocol which is in conflict with the Ethernet control information.

9. A device for transmitting data between a radio equipment (RE) and a radio equipment control (REC) of a radio base station via Ethernet, said device comprising:
   an adaptive physical layer module being arranged for adapting data frames complying with a remote radio protocol to Ethernet data frames that are suitable for transmission over Ethernet physical layer; and
   a physical layer module being arranged for transmitting the adapted Ethernet data frames over the Ethernet physical layer, characterized in that, the adaptive physical layer module comprises:
   a filling module being arranged for filling the data frames complying with the remote radio protocol with redundant bytes, wherein the redundant bytes includes control information inside the Ethernet data frame and control information between the Ethernet data frames, characterized in that, the filling module is arranged to fill a number of /A/ columns, /K/ columns or /R/ columns between the Ethernet data frames, and output the Ethernet data frames to the Ethernet physical layer via XAUI interface, wherein the /A/ column, /K/ column and /R/ column are respectively Align column, Sync column and Skip defined by the Ethernet protocol.

10. The device according to claim 9, characterized in that, the Ethernet is 10 Gigabit Ethernet.

11. The device according to claim 9, characterized in that, the remote radio protocol includes at least one of Common Public Radio Interface (CPRI), OBSAI and Ir.

12. The device according to claim 9, characterized in that, reference clock of the Ethernet physical layer is adapted.

13. The device according to claim 12, characterized in that, the adaptive physical layer module is arranged to use other Ethernet control information to identify the replacing location.

14. The device according to claim 9, characterized in that, the adapted reference clock of the Ethernet physical layer is 153.6 MHz.

15. The device according to claim 9, characterized in that, the adaptive physical layer module comprises:

replacing module being arranged for replacing data in the data frames complying with the remote radio protocol which is in conflict with the Ethernet control information.

16. A device for transmitting data between a radio equipment (RE) and a radio equipment control (REC) of a radio base station via Ethernet, said device comprising:

an adaptive physical layer module being arranged for adapting data frames complying with a remote radio protocol to Ethernet data frames that are suitable for transmission over Ethernet physical layer; and a physical layer module being arranged for transmitting the adapted Ethernet data frames over the Ethernet physical layer, characterized in that, the adaptive physical layer module comprises:

a filling module being arranged for filling the data frames complying with the remote radio protocol with redundant bytes, wherein the redundant bytes includes control information inside the Ethernet data frame and control information between the Ethernet data frames, characterized in that, the filling module is arranged to fill a number of /I/ columns between the Ethernet data frames, and output the Ethernet data frames to the Ethernet physical layer via XGMII interface, wherein the /I/ column are Idle column defined by the Ethernet protocol.

* * * * *